United States Patent Office 3,343,960
Patented Sept. 26, 1967

3,343,960
COUPLING COMPONENTS FOR LIGHT-
SENSITIVE DIAZO COATINGS
Oskar Süs, Wiesbaden-Biebrich, Germany, assignor, by mesne assignments, to Keuff & Esser Company, Hoboken, N.J.
No Drawing. Filed Sept. 11, 1964, Ser. No. 395,900
Claims priority, application Germany, Sept. 14, 1963, K 50,827
16 Claims. (Cl. 96—91)

The present invention relates to light-sensitive diazo coatings and refers more particularly to coupling components for dry-developing light-sensitive diazo materials.

Light-sensitive coatings containing an aromatic diazo compound and an aromatic coupling component capable of coupling with the diazo compound are well known in the diazotype reproduction process. A large number of aromatic compounds have been used as coupling components. Their selection depends upon factors such as the desired color of the azo dyestuff ultimately obtained. Formerly, red to red-brown colors were satisfactory, but now these colors fail to meet modern reproduction requirements. Darker colors are preferred because of greater contrast. Blue colors which appear practically black are particularly desirable.

The amides of 2-hydroxy-naphthalene-3-carboxylic acid which are well known coupling components in the dye industry have also gained importance in the diazotype process, particularly for the production of blue line copies. However, the arylamides of this acid had been used almost exclusively for the production of dyes, while the aliphatic amides of the acid were used in the diazotype process. The aliphatic radicals typically included basic groups capable of forming salts. These salts dissolved well in water. Furthermore the aliphatic radicals may include one or more hydroxy groups which considerably increase the water solubility of the amides. However, the water-solubility of these substituted aliphatic or alkyl amides was still unsatisfactory, so that the addition of solvents was necessary. Aqueous solutions of these amides to which solvents have been added have the disadvantage of penetrating too deeply into porous supports, such as paper. For this reason, these compounds were used only for developing solutions in the so-called semi-dry process for producing blue lines on finished copies.

Thus, the alkyl amides and arylamides of 2-hydroxy-naphthalene-3-carboxylic acid, which did not contain these functional groups, were pratically useless for the dry developing diazotype process because of their low water solubility. They were applicable only for coating hydrophobic films, since they must be dissolved in organic solvents for application to such surfaces.

The difficulty or impossibility of using the amides of 2-hydroxy-naphthalene-3-carboxylic acid for the dry developing diazotype process has always been a great disadvantage because these compounds form azo dyes with excellent color qualities and because they are technically available.

It has now been found that the alkyl-, cycloalkyl-, and arylamides of 2 - hydroxy-naphthalene-3-carboxylic acid which are not sufficiently water-soluble can be used as coupling components in light-sensitive dry-developing diazotype coatings when the naphthalene nucleus contains an aminomethyl group in the 1-position. The compounds are particularly suitable for dry development of materials coated from aqueous solutions. The light-sensitive coatings contain an aromatic diazo compound, common additives, and an amide of 2-hydroxy-naphthalene-3-carboxylic acid which has the following general formula:

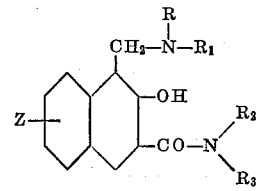

in which R and $R_1$ individually represent unsubstituted or substituted alkyl or cycloalkyl groups, $R_2$ is hydrogen or an alkyl group which may be substituted, and $R_3$ is an alkyl, arylalkyl, or aryl group which may be substituted, or in which R and $R_1$, or $R_2$ and $R_3$, or both pairs stand for alkylene groups linked with a carbon, oxygen, sulphur or nitrogen atom to form a ring, and in which Z stands for hydrogen, halogen or an alkoxy group. The nitrogen atom of the aminomethyl group may also be present in the form of a salt such as the hydrochloride or hydrogen sulfate, or in quaternized form.

Therefore one object of the present invention is to provide water-soluble coupling components which are capable of forming dark colors with diazo compounds in a dry-developing diazo material.

Another object is to provide water soluble amides of 2-hydroxy-naphthalene-3-carboxylic acid which form blue colors on dry-developing diazo materials.

Another object is to provide a light-sensitive, dry-developing, water-soluble composition for diazo materials.

Other objects will become apparent in the course of the following specification.

The compounds according to the present invention are prepared by amidating the 2-hydroxy-naphthalene-3-carboxylic acid with a primary or secondary amine, and subsequently subjecting the amide to the Mannich reaction. The 2-hydroxy-naphthalene-3-carboxylic acid is used as the starting compound. It may be substituted in the 5-, 6-, 7-, or 8-position by a halogen atom, or by an alkoxy group having low molecular weight and one to four carbon atoms.

When amidating the free carboxylic acid, it is preferably converted first into its methylester and then reacted with the appropriate amine. It is also possible to amidate the chloride of the carboxylic acid. The reaction may be carried out in one stage by dissolving the free carboxylic acid in neutral solvents together with phosphorous chloride and amine, and isolating the acid amide from the resulting reaction mixture.

Primary and secondary amines of the aliphatic, alicyclic, aralkane or aromatic series are suitable for amidation. The hydrocarbon radicals in these amines may be straight or branched alkyl radicals, or cycloalkyl radicals, such as cyclohexyl or cyclopentyl radicals, or low molecular weight alkylation products of these radicals. A suitable arylalkyl radical is the benzyl radical, and a suitable aryl radical is the phenyl radical and its alkyl substitution products of low molecular weight. The secondary amines may have identical or different radicals.

The following compounds which are listed by way of example are suitable primary amines: methylamine, ethylamine, hydroxyethylamine, isopropylamine, n-butylamine, isobutylamine, n-hexylamine, cyclohexylamine, p-methylcyclohexylamine, benzylamine, aniline, o-toluidine, m-toluidine, p-toluidine, and the isomeric xylidines. The following secondary amines are suitable: dimethylamine, diethylamine, bis-(hydroxyethyl)-amine, ethyl cyclohexylamine, methylbenzylamine, dicyclohexylamine, methyl aniline, ethyl aniline, and the like. Secondary amines in which two alkyl groups are linked with a carbon, oxygen, sulphur or nitrogen atom to form a ring having preferably five or six members are also suitable. Compounds of this type are pyrrolidine, piperidine, morpholine, thiomorpholine, piperazine, and their alkyl substitution products of low molecular weight. Hydroxy and amino groups which are present in the form of salts may be included as substituents in the hydrocarbon radicals of these amines.

The amines containing aryl groups may also contain non-reactive substituents such as alkoxy groups or chlorine atoms in their aryl nuclei. These substituents must, however, not have a noticeable negative effect on the water-solubility of the carboxylic acid amide to be prepared. Finally, ammonia is also a suitable amidation compound. In this case, the unsubstituted amide of the 2-hydroxy-naphthalene-3-carboxylic acid is obtained.

For aminomethylation according to the Mannich reaction, the acid amide which may be used in the form of one of its salts such as in the form of the hydrochloride, was dissolved in a solvent such as methanol or ethanol or in an ether such as dioxane or tetrahydrofuran together with a secondary amine of the aliphatic, cycloaliphatic or heterocyclic series, and subsequently an aqueous solution of formaldehyde or paraformaldehyde was added. The amine and formaldehyde were used in at least equimolecular amounts as compared with the acid amide. Here secondary aliphatic amines having between one and six carbon atoms or cycloaliphatic amines having five to six carbon atoms were preferred. Piperidine, morpholine, piperazine, and their homologs of low molecular weight were suitable. As a secondary diamine, piperazine can react with two molecules of the 2-hydroxy-naphthalene-3-carboxylic acid. In this case only half the equimolecular amount of amine was required. The 1-aminomethyl-2-hydroxy-naphthalene-3-carboxylic acid amide was isolated from the reaction mixture in its free form or in the form of one of its acid salts such as the hydrochloride. Example 1 gives a detailed description of the preparation of 1-morpholinomethyl-2-hydroxy-naphthalene-3-carboxylic acid amide-hydrochloride.

The 1-aminomethyl-2-hydroxy-naphthalene-3-carboxylic acid amide need not be necessarily prepared according to the method described above. If desired, parts of the process may be varied or carried out in different succession. The 1-aminomethyl-2-hydroxy-naphthalene-3-carboxylic acid amides are new. For the preparation of light-sensitive coatings they were generally used in the form of their salts. It is also possible to add the free bases to the coating solutions which are always acid. In this case they dissolve in the coating solution, forming a salt.

A large number of diazo compounds which are known for the diazotype process are suitable for use in the light-sensitive coatings according to the present invention in conjunction with the coupling components containing the aminomethyl groups. Preferably, however, basic diazo compounds derived from p-phenylene diamine in which one amino group is diazotized and the other amino group is a tertiary amino group, was used in order to obtain deep colors. Particularly strong and deep blue tones were obtained with highly light-sensitive diazo compounds which were similar to the above-mentioned compounds but which also contained one or two alkoxy groups of low molecular weight, in particular methoxy or ethoxy groups in para-position to each other on the benzene nucleus. The preferred group of diazo compounds has the following formula:

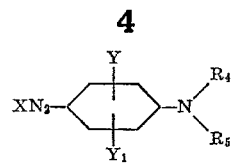

where $R_4$ and $R_5$ stand for identical or different alkyl radicals of low molecular weight which may contain hydroxyl groups if desired and which have preferably between one and six carbon atoms, and which may also be linked to form a ring with five or six members with a carbon, oxygen, sulphur or nitrogen atom, X stands for an acid radical, and Y and $Y_1$ for hydrogen or alkoxy groups of low molecular weight, Y and $Y_1$ being in para-position to each other if they both stand for alkoxy groups. The salts of the following compounds are named by way of example: 1-diazo-4-diethylamino benzene, 1-diazo-2-ethoxy-4-N-diethylaminobenzene, 1-diazo-4-N-hydroxyethylethylamino benzene, 1 diazo-2,5-dimethoxy-4-morpholinobenzene, and 1-diazo-2,5-diethoxy-4-morpholinobenzene.

The diazo component and the coupling component were applied in known manner from an aqueous solution to a support. In addition, this solution contained inorganic or organic acids such as hydrochloric acid, boric acid, formic acid, citric acid, or 1,3,6-napthalene-trisulfonic acid, and in most cases inorganic salts such as zinc chloride or aluminum sulfate as stabilizers. When desired, the sensitizing solutions contained further additions which speed up the solution of the coupling component or assist the subsequent coupling process. Such additions were urea, thiourea, or water-miscible organic solvents such as acetone, methylethylketone, ethylene glycol, methyl ethylene glycol, and the like. The coated and dried support was then exposed and developed in known manner.

Although the 1-position in the naphthalene nucleus of the carboxylic acid amide according to the present invention, that is, the position in which coupling with the diazo compound is to take place, is filled, coupling takes place nevertheless with the diazo compounds generally used for the diazotype process even with compounds having low coupling energy. The Mannich group is eliminated during the coupling reaction. This initial primary reaction causes a delay in the formation of the dyestuff which makes it possible to use the 2-hydroxynaphthalene-3-carboxylic acid amide which normally couples too quickly for the dry development process.

Photocopies with strong violet to blue lines with a greenish tinge were obtained. When a suitable yellow component was added, black tones were also obtained. The light-sensitive coatings according to the present invention were suitable for coating paper as well as plastic foils.

The invention will be illustrated in greater detail in the following examples and tables.

*Example 1*

2.1 g. of 1-morpholinomethyl-2-hydroxy-naphthalene-3-carboxylic acid-amide-hydrochloride (Formula 5) and 1.85 g. of 1-diazo-2,5-diethoxy-4-morpholinobenzene were added to a solution of:

80.0 ml. water,
4.0 g. citric acid,
4.0 g. thiourea,
2.0 g. zinc chloride,
2.0 ml. concentrated hydrochloric acid.

Water was added to this solution to bring up the volume to 100.0 ml. Then it was filtered and coated onto a photocopying base paper. After exposure of the diazotype coating under a transparent original, it was developed with ammonia vapor. Light blue copies with a violet tinge were obtained.

The coupling component (Formula 5) was prepared as follows: 18.7 parts by weight of 2-hydroxy-naphthalene-3-carboxylic acid amide were dissolved in 150.0 parts by volume of dioxane. Subsequently, and while shaking the mixture at 40° C., 7.7 parts by weight of morpholine and finally 10.0 parts by weight of a 30% solution of formaldehyde were added. After standing for half an hour, the solution was rendered acid to Congo red by adding a 32% hydrochloric acid. The 1-morpholinomethyl - 2 - hydroxy-naphthalene-carboxylic acid amide was precipitated as the hydrochloride in the form of yellow crystals. It was drawn off by suction and recrystallized from water. The melting point was 214–215° C.

*Example 2*

As described in Example 1, a solution was prepared from the following compounds:

80.0 ml. water,
2.0 g. citric acid,
2.0 g. boric acid,
5.0 g. thiourea,
2.0 ml. glycol,
2.0 ml. concentrated hydrochloric acid,
2.2 g. 1-morpholinomethyl-2-hydroxynaphthalene-3-carboxylic acid butylamide-hydrochloride (Formula 7),
1.6 g. 1-diazo-2-ethoxy-4-N-diethylamino-benzene.

Water was added to bring up the volume to 100.0 ml. Photocopies were prepared as described in Example 1. Copies with neutral blue lines were obtained.

*Example 3*

A solution was prepared from the following:

80.0 ml. water,
5.0 g. citric acid,
2.0 g. aluminum sulfate,
3.0 g. 1,3,6-naphthalene-trisulfonic acid (sodium salts),
3.0 g. thiourea,
2.3 g. 1-piperidinomethyl-2-hydroxynaphthalene-3-carboxylic acid ethanolamide (Formula 2),
1.5 g. 1-diazo-4-N-hydroxyethyl-ethylamino-benzene.

Water was added to bring up the volume to 100.0 ml. Subsequently, the solution was coated onto a photocopying base paper. Copies were obtained as described in Example 1. The copies had neutral blue lines.

*Example 4*

A cellulose acetate foil was coated with a solution of:

40.0 ml. methyl glycol,
40.0 ml. methylethyl ketone,
10.0 ml. water,
10.0 ml. formic acid,
2.0 g. citric acid,
4.0 g. 1-morpholinomethyl-2-hydroxynaphthalene-3-carboxylic acid ethanolamide-hydrochloride (Formula 3),
3.4 g. 1-diazo-2,5-dimethoxy-4-morpholino-benzene (fluoborate).

Subsequently, photocopies were prepared as described in Example 1. Copies with strong violet-blue lines were obtained.

Instead of the compounds given in Examples 1–4, the compounds listed in the following table were used with equally good results. The compounds used in Examples 1–4 are also listed in the table. For each of the twenty coupling components listed in the table, the color obtained on normal photocopying paper is given.

TABLE (1) 1 - dimethylaminomethyl - 2 - hydroxy-naphthalene - 3 - carboxylic acid ethanolamide-hydrochloride _____ Neutral blue.
(2) 1 - piperidinomethyl - 2-hydroxynaphthalene - 3 - carboxylic acid-ethanolamide-hydrochloride _____ Neutral blue.
(3) 1 - morpholinomethyl - 2 - hydroxy-naphthalene - 3 - carboxylic acid-ethanolamide-hydrochloride _____ Blue-green to blue-violet.
(4) N,N' - bis - (1 - methylene-2-hydroxy-naphthalene - 3 - carboxylic acid-ethanolamide)-piperazine-hydrochloride _____ Violet-blue.
(5) 1 - morphoninomethyl - 2 - hydroxy-naphthalene - 3 - carboxylic acid-amide-hydrochloride _____ Bright blue.
(6) 1 - dimethylaminomethyl - 2 - hydroxy-naphthalene - 3 - carboxylic acid-anilide __ Grey-blue.
(7) 1 - morpholinomethyl - 2 - hydroxy-naphthalene - 3 - carboxylic acid-n-butyl-amide-hydrochloride _____ Neutral blue.
(8) 1 - morpholinomethyl - 2 - hydroxy-naphthalene - 3 - carboxylic acid-sec-butylamide-hydrochloride _____ Neutral blue.
(9) 1 - dimethylaminomethyl - 2 - hydroxy-naphthalene - 3 - carboxylic acid-n-butyl-amide-hydrochloride _____ Neutral blue.
(10) 1 - dimethylaminomethyl - 2-hydroxy-naphthalene - 3 - carboxylic acid-sec-butylamide-hydrochloride _____ Neutral blue.
(11) 1 - morpholinomethyl - 2 - hydroxy-naphthalene - 3 - carboxylic acid-morpholide _____ Blue-violet.
(12) 1 - morpholinomethyl - 2 - hydroxy-naphthalene - 3 - carboxylic acid-piperidide _____ Blue with red tinge.
(13) 1 - morpholinomethyl - 2 - hydroxy-naphthalene - 3 - carboxylic acid-diethyl-amide _____ Blue-violet.
(14) 1 - morpholinomethyl - 2 - hydroxy-naphthalene-3-carboxylic acid - N-ethyl-anilide _____ Blue with red tinge.
(15) 1 - morpholinomethyl - 2 - hydroxy-6 - methoxy - naphthalene - 3-carboxylic acid-piperidide _____ Blue-violet.
(16) 1 - morpholinomethyl - 2 - hydroxy-6 - methoxy - naphthalene - 3-carboxylic acid-morpholide _____ Blue with red tinge.
(17) 1 - dimethylaminomethyl - 2-hydroxy-6 - bromo - naphthalene - 3 - carboxylic acid - di(hydroxyethyl) - amide - hydrochloride _____ Blue with green tinge.
(18) 1 - morpholinomethyl - 2 - hydroxy-naphthalene - 3 - carboxylic acid-pyrrolidide _____ Blue-violet.
(19) 1 - morpholinomethyl - 2 - hydroxy-6 - bromo - naphthalene - 3 - carboxylic acid-pyrrolidide _____ Blue-violet.
(20) 1 - morpholinomethyl - 2 - hydroxy-naphthalene - 3 - carboxylic acid-N-methyl-benzylamide _____ Blue with red tinge.

It is apparent that the described examples are capable of many variations and modifications. All such variations and modifications are to be included within the scope of the present invention.

What is claimed is:

1. A water-soluble coupling component for dry-developing diazotype materials, said coupling component comprising a 1-aminomethyl-2-hydroxy-naphthalene-3-carboxylic acid amide having the general formula:

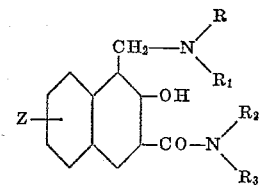

where R and $R_1$ are members selected from one of the groups consisting of:
   group A wherein R and $R_1$ are selected individually from the group consisting of alkyl and cycloalkyl radicals; and
   group B wherein R and $R_1$ are members of the same 5 or 6 membered heterocyclic ring;
where $R_2$ and $R_3$ are members selected from one of the groups consisting of:
   group C wherein $R_2$ and $R_3$ are members selected individually from the group consisting of hydrogen, alkyl, aralkyl, and aryl radicals; and
   group D wherein $R_2$ and $R_3$ are members of the same 5 or 6 membered heterocyclic ring;
and where Z is a member selected from the group consisting of hydrogen, halogen, and alkoxy radicals of from one to four carbon atoms.

2. A coupling component in accordance with claim 1 in which the aminomethyl group is in the form of a salt.

3. A coupling component in accordance with claim 1 which is 1-morpholinomethyl-2-hydroxy-naphthalene-3-carboxylic acid amide-hydrochloride.

4. A coupling component in accordance with claim 1 which is 1-morpholinomethyl-2-hydroxy-naphthalene-3-carboxylic acid-n-butylamide-hydrochloride.

5. A coupling component in accordance with claim 1 which is 1-piperidinomethyl-2-hydroxy-naphthalene-3-carboxylic acid-ethanolamide-hydrochloride.

6. A coupling component in accordance with claim 1 which is 1-morpholinomethyl-2-hydroxy-naphthalene-3-carboxylic acid-ethanolamide-hydrochloride.

7. A coupling component in accordance with claim 1 which is 1-morpholinomethyl-2-hydroxy-naphthalene-3-carboxylic acid-morpholide.

8. A light-sensitive composition for dry-developing diazotype material comprising an aromatic diazo compound and an aromatic coupling component capable of coupling with said diazo compound, said coupling component being a 1-aminomethyl-2-hydroxy-naphthalene-3-carboxylic acid amide having the general formula:

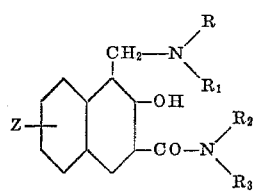

where R and $R_1$ are members of one of the groups consisting of:
   group A wherein R and $R_1$ are selected individually from the group consisting of alkyl and cycloalkyl radicals; and
   group B wherein R and $R_1$ are members of the same 5 or 6 membered heterocyclic ring;
where $R_2$ and $R_3$ are members selected from one of the groups consisting of:
   group C wherein $R_2$ and $R_3$ are members selected individually from the group consisting of hydrogen, alkyl, aralkyl, and aryl radicals; and
   group D wherein $R_2$ and $R_3$ are members of the same 5 or 6 membered heterocyclic ring;
and where Z is a member selected from the group consisting of hydrogen, halogen, and alkoxy radicals of from one to four carbon atoms, and said diazo compound has the general formula:

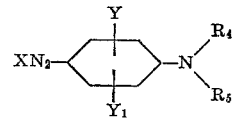

where $R_4$ and $R_5$ are members selected from the groups consisting of:
   group E wherein $R_4$ and $R_5$ are members selected from the group consisting of low molecular weight alkyl radicals and hydroxy alkyl radicals; and
   group F wherein $R_4$ and $R_5$ are members of the same heterocyclic ring;
where Y and $Y_1$ are members selected from the group consisting of hydrogen and alkoxy groups of low molecular weight and Y and $Y_1$ are in para-position to each other when both are alkoxy, and where X is an acid radical.

9. Diazotype material comprising:
   (a) a support; and
   (b) a light-sensitive composition comprising:
      (1) a light-sensitive diazonium compound; and
      (2) a coupler component capable of forming a colored azo dye with said diazonium compound, said coupler component comprising a 1-aminomethyl-2-hydroxy-naphthalene-3-carboxylic acid amide according to claim 1.

10. Diazotype material comprising:
   (a) a support; and
   (b) a light-sensitive composition comprising:
      (1) a light-sensitive diazonium compound; and
      (2) a coupler component capable of forming a colored azo dye with said diazonium compound, said coupler component comprising an acid salt of a 1-aminomethyl-2-hydroxy-naphthalene-3-carboxylic acid amide according to claim 1.

11. Diazotype material according to claim 10 wherein said coupler component is the hydrochloride salt.

12. Diazotype material according to claim 11 wherein said coupler compound is 1-morpholinomethyl-2-hydroxy-naphthalene-3-carboxylic acid-amide-hydrochloride.

13. Diazotype material according to claim 11 wherein said coupler compound is 1-morpholinomethyl-2-hydroxy-naphthalene-3-carboxylic acid-n-butylamide-hydrochloride.

14. Diazotype material according to claim 11 wherein said coupler compound is 1-piperadinomethyl-2-hydroxy-naphthalene-3-carboxylic acid ethanolamide-hydrochloride.

15. Diazotype material according to claim 11 wherein said coupler compound is 1-morpholinomethyl-2-hydroxy-naphthalene-3-carboxylic acid-ethanolamide-hydrochloride.

16. Diazotype material according to claim 10 wherein said diazonium compound is a p-phenylene diamine derivative having the general formula:

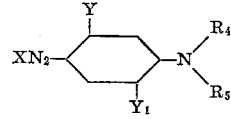

wherein $R_4$ and $R_5$ are selected from:
   group E wherein $R_4$ and $R_5$ are selected from the group consisting of alkyl and hydroxy-alkyl radicals having one or two carbons; and
   group F wherein $R_4$ and $R_5$ are members of a 5 or 6 membered heterocyclic ring with the nitrogen atom;
Y and $Y_1$ are members selected from the group consisting of hydrogen and alkoxy groups of low molecular weight; and
X is an acid radical.

(References on following page)

References Cited

UNITED STATES PATENTS

| | | | |
|---|---|---|---|
| 2,150,565 | 3/1939 | Schmidt | 96—91 XR |
| 2,233,038 | 2/1941 | Sus et al. | 96—91 |
| 2,551,570 | 7/1951 | Sus et al. | 96—91 |
| 2,792,303 | 5/1957 | Sanders et al. | 96—91 |
| 2,819,268 | 1/1958 | Baisse et al. | 260—268 |
| 2,946,684 | 7/1960 | Sus et al. | 96—91 |
| 3,043,827 | 7/1962 | Straley et al. | 260—560 XR |
| 3,064,049 | 11/1962 | Cox | 96—91 XR |
| 3,079,375 | 2/1963 | Straley et al. | 260—560 XR |
| 3,255,010 | 6/1966 | Sus et al. | 96—91 XR |

OTHER REFERENCES

Venkataraman, K.: "The Chemistry of Synthetic Dyes," vol. I, Academic Press Inc., New York, 1952, pp. 522 and 438–439 relied on.

NORMAN G. TORCHIN, *Primary Examiner.*

ALEXANDER D. RICCI, *Examiner.*

C. BOWERS, *Assistant Examiner.*

UNITED STATES PATENT OFFICE
CERTIFICATE OF CORRECTION

Patent No. 3,343,960 September 26, 1967

Oskar Süs

It is hereby certified that error appears in the above numbered patent requiring correction and that the said Letters Patent should read as corrected below.

In the heading to the printed specification, line 5, for "Keuff & Esser Company" read -- Keuffel & Esser Company --.

Signed and sealed this 1st day of October 1968.

(SEAL)
Attest:

Edward M. Fletcher, Jr.
Attesting Officer

EDWARD J. BRENNER
Commissioner of Patents